Patented Sept. 29, 1953

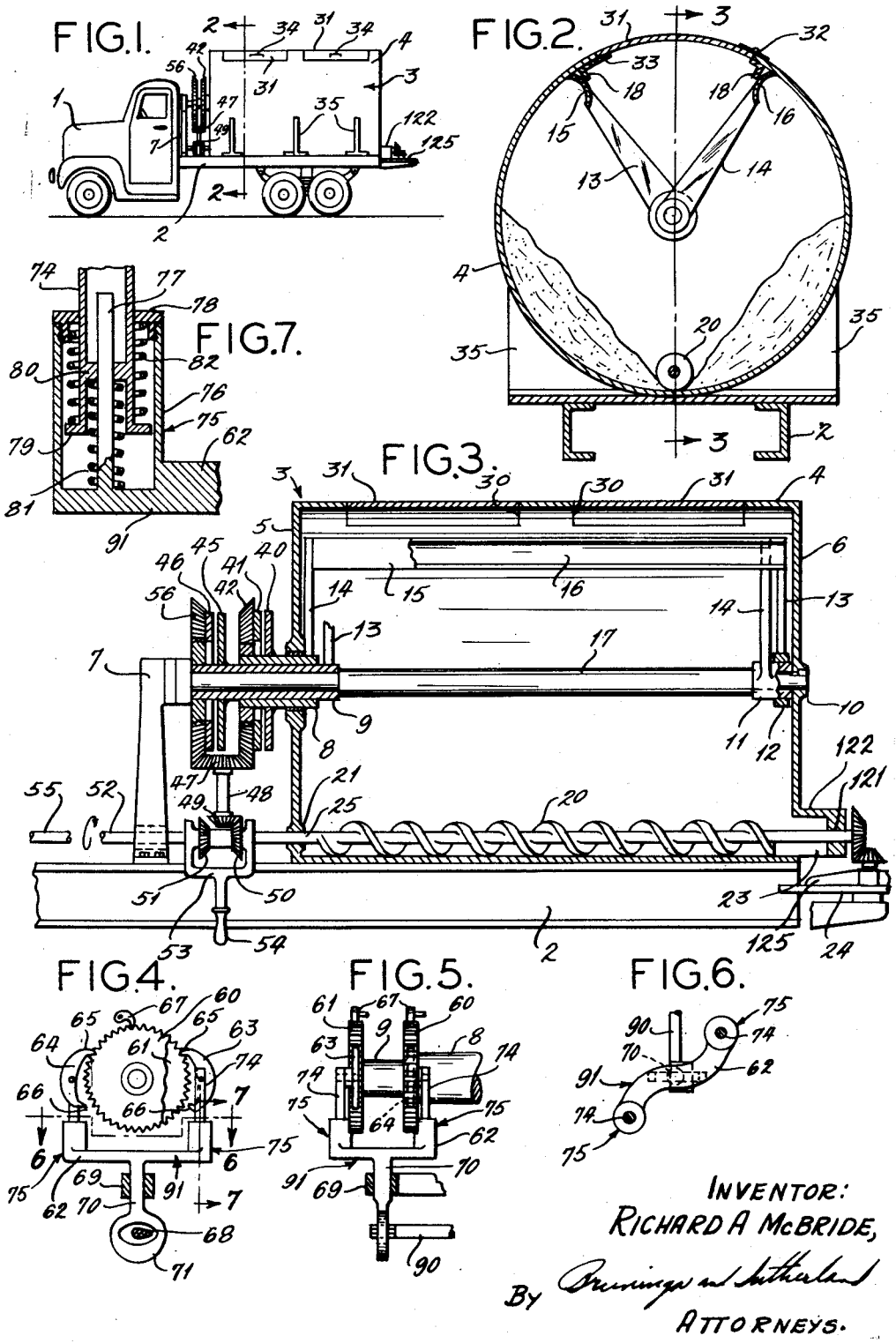

2,653,724

UNITED STATES PATENT OFFICE 2,653,724

SELF-UNLOADING TRUCK BODY

Richard A. McBride, Alton, Ill.

Application February 14, 1951, Serial No. 210,855

6 Claims. (Cl. 214—519)

This invention relates to truck bodies and in particular to truck bodies for the transportation and discharge of flowable solid materials such, for example, as agricultural lime.

Truck bodies in general use heretofore for transporting and discharging materials such as agricultural lime have been made hopper-shaped to feed the material to a conveyer running lengthwise beneath the bodies. These hopper-shaped bodies have been open at their tops, with slanting trough-like sides. The construction of these bodies has been difficult and expensive. The shape of these bodies does not make for great inherent strength and rigidity, nor for stability since the body slopes to a narrow bottom. The slanting sides of the trough have to be braced at closely spaced intervals. Furthermore, the capacity of bodies of this nature has been relatively small as compared with the material used in their construction. The absolute capacity of these bodies has also been limited by the fact that the sharply slanting sides of the trough unduly increase the height of the body from the ground. The disadvantages of the open top in leaving the materials, or the conveyer, when the truck body is empty, exposed to the elements, is clear.

One of the objects of this invention is to provide a simple, sturdy, rigid truck body, which is cheap to manufacture and of high capacity with a low amount of construction material.

Another object is to provide such a truck body which is covered.

Other objects will be apparent to those skilled in the art in the light of the following specification and accompanying drawing.

In accordance with an illustrative embodiment of this invention, a truck body is provided which is substantially cylindrical. The cylindrical body is to be mounted horizontally on the bed of a truck. A conveyer extends along the length of the bottom of the body and is adapted to be driven by the power take-off of the truck. The angle of repose of material within the body will seldom be so small as to allow all of the material to reach the conveyer by gravity alone when the material is discharged. In order to urge the material onto the conveyer, scrapers are mounted within the body coaxially with the horizontal axis of the body. The scrapers extend substantially through the length of the body and closely adjacent the cylindrical walls. Means are provided for rotating the scrapers in opposite directions toward the conveyer and for raising the scrapers to their initial position away from the conveyer. When these means are power means, a yielding connection is provided between the power source (generally the power take-off of the truck) and the scrapers to allow the power source to continue without stalling while one or both of the scrapers remain stationary when the condition of the material is such as to obstruct the scrapers or when the scrapers have reached the end of their upward or downward travel. Ports may be cut in the top of the cylinder to permit the body's being loaded and the plates so cut out may be used as covers.

In the drawings:

Figure 1 represents a truck having a body constructed in accordance with one embodiment of this invention;

Figure 2 is a sectional view taken along the line 2—2 of Figure 1;

Figure 3 is a sectional view taken along the line 3—3 of Figure 2;

Figure 4 is a detail view of another embodiment of scraper driving means;

Figure 5 is a view in side elevation of the scraper driving means shown in Figure 4;

Figure 6 is a sectional view taken along the line 6—6 of Figure 4; and

Figure 7 is a sectional view taken along the line 7—7 of Figure 4.

Referring now to the illustrative embodiment shown in the drawing, 1 represents a truck having a bed 2 on which is mounted a body 3. In the embodiment shown, the body 3 comprises a cylindrical shell 4 and plane ends 5 and 6. In this embodiment, an exterior bearing 7 is provided supporting a central shaft 17, upon which is rotatably mounted a hollow shaft 8 and a shaft 9 concentric with and rotatable upon the shaft 8. A bearing 10 is provided in end 6 to support shaft 17. Revolvably mounted on shaft 17 adjacent end 6 is a sleeve 11. Revolvably mounted on sleeve 11 is an outer sleeve 12. Welded, keyed or otherwise secured to sleeves 9 and 11 are arms 14. Running lengthwise of the body 3 between arms 13 is a scraper blade 15. Running between arms 14 is a scraper blade 16. Scraper blades 15 and 16 extend radially closely adjacent the inside surface of the cylindrical shell 4. The upward travel of scraper blades 15 and 16 may be limited by stops 18. The downward travel in the embodiment shown is limited by contact with a screw conveyer 20.

In the embodiment shown, the screw conveyer 20, having a shaft 25, is carried by a bearing 21 in the body end 5, and a bearing 121 mounted on a pipe 122. The pipe 122 is welded or otherwise secured to the body end 6, and is cut away along its bottom to form a discharge port 23. In the embodiment shown, port 23 is positioned to discharge material onto a horizontal whirler plate 24 mounted on the rear of the truck frame. This type of distributor is provided with radial arms 125 and is ordinarily rotated by a jack shaft from the power plant of the truck. In the embodiment shown, the shaft 25 is prolonged beyond the bearing 121 and provided with a bevel gear 126, engaging with a bevel gear 127 secured to whirler plate 24, to rotate that plate when the conveyer 20 is rotated. Loading ports 30 extend along the length of the body but are interrupted through a central portion and short of the two ends to strengthen the body. Covers 31, for which the sections cut out to form loading ports 30 may be utilized, are hinged at 32 in the embodiment shown and rest upon flanges 33. The covers 31 are provided with handles 34.

In the embodiment shown, the body 3 is mounted upon the bed 2 of the truck by means of ribs 35 welded to the cylindrical shell 4 and bolted or otherwise secured to the bed 2.

Two embodiments of scraper driving means are illustrated in the drawing. In the embodiment shown in Figure 3, a friction clutch type drive is indicated somewhat diagrammatically. The clutch plate 40 is keyed or otherwise secured to the shaft 8. The corresponding plate 41 of the clutch is revolvably mounted on the shaft 8 and is provided with bevel teeth 42. Secured to shaft 9 is a clutch plate 45. Its corresponding clutch member 46 is mounted for rotation on shaft 9. Clutch member 46 is also provided along its periphery with bevel teeth 56. Clutch members 41 and 46 are driven by bevel gear 47 connected by a shaft 48 with a lower bevel gear 49. Lower bevel gear 49 is positioned to be driven by either forward driving bevel gear 50 or reversing bevel gear 51. Forward driving bevel gear 50 and reversing bevel gear 51 are slideably keyed to shaft 52 and are moved into and out of engagement with lower bevel gear 49 by means of gear shifting fork 53. In the somewhat diagrammatic view shown, gear shifting fork 53 is provided with a handle 54. A neutral position may also be provided for gear shifting fork 53 in which neither bevel gears 50 or 51 engage lower bevel gear 49. Shaft 52 is adapted to be connected to power take-off shaft 55 of the truck. The other end of shaft 52 is, in the embodiment shown, connected with screw conveyer shaft 25. Clutch members 45 and 46 and 40 and 41 may remain in constant engagement.

In the operation of a truck equipped with a body constructed in accordance with that embodiment of this invention in which a clutch type scraper driving mechanism is employed, the scraper arms are first brought to their uppermost position. The body is filled through the loading ports 30. The natural rounding-off of the material as it is loaded along the center of the body will assure practically a capacity load without shifting the loading spigot or blowing the material to the side. During the loading operation, the scrapers may be maintained in their uppermost position by keeping lower bevel gear 49 in engagement with reversing bevel gear 51. When the loading is completed, gear shift fork 53 may be moved to the neutral position.

Power is supplied to conveyer 20 by power take-off 55 through shaft 52. When it is desired to discharge the material, the discharge port 23 is opened. The material is discharged to the point at which the angle of repose of the material prevents more of the remaining material from reaching the conveyer. During this time, the gear shifter fork may have been left in its neutral position, when the arms will follow the material of their own weight until that weight is insufficient to overcome the resistance of the material to further urging by the weight of the arms toward the conveyer. If, then, the conveyer fork is moved to the position at which the forward driving bevel gear 50 engages the lower bevel gear 49, the scrapers will push the remaining material from the walls of the body onto the conveyer. The force with which the scrapers are impelled depends upon the adjustment of the friction clutches. The clutches should, of course, be so adjusted as to allow the power take-off and the gears and connecting shafts to revolve without undue strain when the scrapers are prevented from rotating either by the condition of the material or by virtue of their having reached the limit of their travel. To return the scrapers to their uppermost position, it is only necessary to move the gear shifting fork to the position at which the reversing gear engages the lower bevel gear 49.

In the embodiment of scraper rotating means shown in Figures 4 to 7, ratchet wheels 60 and 61 are keyed to shafts 8 and 9, respectively. A yoke 62 carries double-ended pallets 63 and 64. Pallet 64 is positioned to engage ratchet wheel 61, while pallet 63 is positioned to engage ratchet wheel 60. Pallets 63 and 64 are so constructed and pivoted about their centers on yoke 62 as to allow either their upper ends 65 or lower ends 66 to be brought into engagement with their respective ratchet wheels 60 and 61. Pawls 67 are mounted independently of yoke 62 so as to prevent rotation of the respective wheels in one direction when the pawls are thrown into engagement with those wheels. Yoke 62 is supported and driven by a connecting rod 70, suitably journaled in a bearing 69. Connecting rod 70 is connected with a crank 71, driven by a cam 68 on a shaft 90, connected at one end with power take-off 55 and at the other with conveyer shaft 25.

Between the horizontal member 91 and the vertical arms of yoke 62 are interposed yielding lost motion connections 75. These connections are shown in detail in Figure 7. In the embodiment there shown, a sleeve 76 is secured to the horizontal member of yoke 62. Secured to the base of sleeve 76 and extending upwardly within that sleeve is a guide finger 77. Around the upper edge of sleeve 76 is a flange 78 which may take the form of a threaded cap with a central opening. The vertical member 74 of yoke 62 is hollow and provided with an outwardly extending flange 79 around its lower end. An inwardly extending flange 80 is provided within the vertical member 74 near the lower end of that member. A spring 81 surrounds guide finger 77 and rests at its lower end on the bottom of sleeve 76. The upper end of spring 81 engages the inwardly extending flange 80. A spring 82 surrounding the vertical member 74 rests on outwardly extending flange 79 and engages the inwardly extending flange 78 of sleeve 76.

In operation, the connecting rod 70 is reciprocated by the crank 71, reciprocating the yoke 62 and the pallets 63 and 64. When the upper ends 65 of pallets 63 and 64 are thrown into engagement with their respective ratchet wheels and pawls 67 are thrown into engagement to prevent any counterrotation, the scrapers are raised to their uppermost positions. When the scrapers have reached their uppermost positions, the connecting rod 70 and the horizontal member of yoke 62 are free to reciprocate, simply compressing springs 81 on their upstroke and allowing them to expand on their downstroke. The pawl 67 may be left engaged during the loading operation. When the load is to be discharged, pawl 67 is thrown out of engagement and lower ends 66 of the pallets 63 and 64 are moved into engagement with their ratchet wheels to start the scrapers on their downward journey. If the condition of material in the body is such as to prevent the operation of the scrapers, or when the scrapers reach the lower limit of their travel, the connecting rod 70 and the horizontal member 91 of the yoke 62 continue to reciprocate, merely compressing springs 82 on the downstroke and allowing them to expand on the upstroke. Springs 82 may be made heavier than springs 81 for the reason that only sufficient force is required of springs 81 to lift the unloaded scrapers. It can be seen that the force exerted on the scrapers in either direction is dependent upon the strength of the springs.

In the embodiment shown, a shaft 17 runs through the full length of the body and is journaled in the bearing 10 in the rear end 6 of the body and in an external bearing 7 beyond the forward end of the body. It can be seen that the shaft 17 may be eliminated. The hollow shafts 8 and 9 may be supported by a substantial bearing welded or otherwise formed in the end 5. The sleeves 11 and 12 may be carried by a stub shaft welded to the inside of the end 6 or may extend through a bearing in the end 6. In this construction, the external bearing 7 may also be omitted if the forward end bearing is made sufficiently sturdy.

While a screw conveyer has been shown, other types of conveyers may be used, such as belt or drag conveyers. The position of the conveyer may be altered, as by cutting a channel in the bottom of the body and setting the conveyer in a trough beneath that channel.

The shape of the body may also be varied in other respects, as by flattening the top or using convex or concave ends.

The size, shape and construction of the loading ports and covers may be varied. The covers can, for example, simply rest on upwardly extending flanges and need not be hinged.

A simple and altogether satisfactory mounting for the body may be had by running bands over the top of the body from one side of the truck to the other between, and beyond the ends of, the loading ports.

The type of distributor shown in Figures 1 and 2 is commonly used in distributing agricultural lime. Other distributing means, such as the independent, wheeled trailers now used for distributing cinders and gravel, may be used when such materials are being transported in the body of this invention. When the body is used for transporting stoker coal for retail distribution, where the coal is to be conveyed into bins, the overhanging pipe 122 is conveniently located to allow a portable belt conveyer to be placed thereunder. It is apparent that the discharge port 23 may be variously positioned as the pipe 122 is made longer or shorter, and may even be cut entirely from the tank itself, when the bearing 121 can be carried by the end 6. The desired position of the discharge port will be determined by the kind of conveyer used and the material to be handled.

It is common knowledge that the dimensions of a cylinder, the volume of which is a maximum with respect to its surface area, are represented by the equation $H=2R$ in which H is the height and R the radius. These then are the dimensions which will yield the greatest capacity for the least material cost. A truck body having a diameter of six feet and a length of six feet is entirely practical. However, unless material savings are of the utmost importance, variations in relative dimensions will not greatly lessen the advantages of this invention.

A particular virtue of the body of this invention is the ease, simplicity and cheapness of its manufacture. Large cylindrical forms suitable for such use are commonly produced in quantity. It is even possible to use corrugated conduit which is available in standard sizes up to 84 inches in diameter. In the latter case, it is preferable to corrugate the scrapers to correspond with the corrugations of the conduit. This particular construction combines unusual rigidity with light weight.

Power means have been described for rotating the scrapers. If the material to be discharged is light and flows easily, it may be practicable to increase the weight of the scrapers to the point at which no external force need be supplied to urge the material onto the conveyer. For this purpose, and even to assist the outside source, auxiliary weights may be secured to the scrapers. The scrapers may be restored to their raised positions manually, as by a crank, operating a gear and pinion.

Numerous other variations in the construction of the various elements of this invention will occur to those skilled in the art in the light of this disclosure.

While the description of this invention has been directed to truck bodies, it can be seen that the principles of this invention are applicable to other devices such as railroad cars for carrying grain or the like, and even stationary bins.

As has been indicated the body of this invention may be used with a large variety of materials, including, besides agricultural lime, fine coal, dry sand, gravel, grain, cinders, soda ash, salt, sulfur, and commercial fertilizers.

The importance of maintaining many of these materials dry is readily apparent. The importance of protecting the material from being blown off in transit is clear to anyone who has followed an open-type truck on the highway. To guard against loss from these sources, canvas tarpaulins are now often used, but the cost of their upkeep and the time and effort to remove and replace the tarpaulins restrict their use. The ease of enclosing the body of the invention is one of the several advantages thereof.

Thus it can be seen that a simple, sturdy, efficient, cheap, rigid easily enclosed body is provided, having a high capacity with respect to the amount of material necessary for its manufacture.

Having thus described the invention, what is claimed and desired to be secured by Letters Patent is:

1. A truck body for transporting and discharging flowable solid materials, comprising a substantially cylindrical horizontally disposed tank, a conveyer running along the bottom of the tank, a scraper mounted on a shaft, said shaft being concentric with said tank and extending through at least one end of said tank, and means connectible to the power take-off of a truck for rotating said shaft, said means comprising a ratchet wheel mounted on said shaft, pallets to drive the ratchet wheel, and a link, mounted for reciprocating motion and having an intermediate yielding connection, to drive said pallets.

2. A truck body for transporting and discharging flowable solid materials, comprising a substantially cylindrical horizontally disposed tank, a conveyer running along the bottom of the tank, a pair of scrapers each extending through substantially the length of said tank and mounted on one of a pair of concentric shafts extending through at least one of the end walls of said tank, and means for rotating the said shafts in opposite directions with respect to one another to rotate the scrapers toward the conveyer.

3. A truck body for transporting and discharging flowable solid materials, comprising a substantially cylindrical horizontally disposed tank, a conveyer running along the bottom of the tank, a pair of scrapers positioned closely adjacent the inside wall of said tank and each extending through substantially the full length of said tank, each of said scrapers being mounted on one of a pair of concentric shafts extending through at least one of the end walls of said tank, and means, adapted for connection to a power source, for rotating the said shafts in opposite directions with respect to one another to rotate the scrapers toward the conveyer, and to rotate the scrapers away from the conveyer.

4. A truck for transporting and discharging flowable solid materials, comprising a substantially cylindrical body mounted horizontally on the bed of said truck, a conveyer mounted along the bottom of said body, and a pair of scrapers, mounted coaxially with the body within the body and extending lengthwise along substantially the full length of the inner wall thereof, to urge material toward the conveyer from opposite sides of said conveyer.

5. A truck for transporting and distributing flowable solid materials and having a power take-off, comprising a substantially cylindrical body, mounted horizontally on the bed of said truck, spreader means mounted on said truck behind said body, a screw conveyer mounted lengthwise along the bottom of said body, one end of the central shaft of said screw conveyer being connected to be driven by said power take-off, the other end of said central shaft extending beyond the said body and being provided with power transmitting means connected with said spreader means to drive it, and a pair of scrapers mounted coaxially with the body within the body and extending lengthwise along the inner wall thereof to urge material toward the conveyer.

6. A truck body for transporting and discharging flowable solid materials, comprising a substantially cylindrical horizontally disposed tank, a conveyer running along the bottom of the tank, a pair of scrapers each mounted on a shaft extending through at least one end of said tank and means connectible to the power take-off of a truck for rotating said shaft, said means comprising friction clutches mounted on the scraper shafts, each clutch having an element fixed to its shaft and an element mounted for rotation, means for rotating the rotatable elements of said clutches, said means being adapted for connection to the power take-off of the truck and being provided with means for reversing the direction of rotation of the clutches.

RICHARD A. McBRIDE.

References Cited in the file of this patent

UNITED STATES PATENTS

| Number | Name | Date |
|---|---|---|
| 1,165,736 | White | Dec. 28, 1915 |
| 1,530,659 | Force | Mar. 24, 1925 |
| 1,960,075 | Ackerman | May 22, 1934 |
| 2,116,603 | Holly | May 10, 1938 |
| 2,320,976 | McCartney et al. | June 1, 1943 |
| 2,522,077 | Wahl et al. | Sept. 12, 1950 |